(12) United States Patent
Selden

(10) Patent No.: US 11,961,185 B2
(45) Date of Patent: *Apr. 16, 2024

(54) MESHING OPERATION FOR REPRESENTING A 3D PRINTED OBJECT

(71) Applicant: Markforged, Inc., Watertown, MA (US)

(72) Inventor: Jeffrey Lee Selden, Laramie, WY (US)

(73) Assignee: Markforged, Inc., Watertown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/078,235

(22) Filed: Dec. 9, 2022

(65) Prior Publication Data
US 2023/0109599 A1    Apr. 6, 2023

Related U.S. Application Data

(63) Continuation of application No. 17/095,075, filed on Nov. 11, 2020, now Pat. No. 11,551,417.
(Continued)

(51) Int. Cl.
*G06T 17/20* (2006.01)
*B29C 64/205* (2017.01)
(Continued)

(52) U.S. Cl.
CPC .......... *G06T 17/20* (2013.01); *B29C 64/205* (2017.08); *B29C 64/393* (2017.08); *G06F 30/23* (2020.01);
(Continued)

(58) Field of Classification Search
CPC ......... G06T 17/20; G06T 17/10; G06F 30/23; B29C 64/393; B29C 64/205; B33Y 50/02; B33Y 30/00
See application file for complete search history.

(56) References Cited

U.S. PATENT DOCUMENTS

2006/0290695 A1*  12/2006  Salomie ................. G06T 17/20
                                                       345/423
2009/0136103 A1*  5/2009  Sonka ................. G06V 10/7635
                                                       382/128

(Continued)

OTHER PUBLICATIONS

Lo, Daniel S. H.; "Finite Element Mesh Generation"; 2015; pp. 1-5, 86-91, and 312-321; CRC Press, Boca Raton, FL (23 pages).

Zhang, Yongjie et al.; "Adaptive and Quality Quadrilateral/Hexahedral Meshing from Volumetric Data"; Jan. 20, 2005; pp. 1-22; Institute for Computational Engineering and Sciences, Department of Computer Sciences, The University of Texas at Austin (22 pages).

(Continued)

*Primary Examiner* — Michelle Chin
(74) *Attorney, Agent, or Firm* — Venable LLP

(57) ABSTRACT

A method for generating a more accurate mesh that represents a 3D printed part based on a model includes slicing the model into layers and identifying an infill-wall boundary and an exterior-interior boundary of each layer of the model. Layers of the model may be identified as critical by iterative comparison with adjacent layers. An interior voxel mesh may be constructed based on common two-dimensional reference grids imposed on the critical layers. The interior voxel mesh may be augmented to an augmented mesh and then extended to a protomesh. The protomesh may be extruded to construct the final mesh, which may be analyzed by finite element analysis. The part may be 3D printed based on the layers output by the slicing operation.

20 Claims, 17 Drawing Sheets

Related U.S. Application Data

(60) Provisional application No. 62/936,148, filed on Nov. 15, 2019.

(51) Int. Cl.
*B29C 64/393* (2017.01)
*G06F 30/23* (2020.01)
*G06T 17/10* (2006.01)
*B33Y 30/00* (2015.01)
*B33Y 50/02* (2015.01)

(52) U.S. Cl.
CPC ............... *G06T 17/10* (2013.01); *B33Y 30/00* (2014.12); *B33Y 50/02* (2014.12)

(56) References Cited

U.S. PATENT DOCUMENTS

| | | |
|---|---|---|
| 2018/0046168 A1 | 2/2018 | Kumar et al. |
| 2018/0240263 A1 | 8/2018 | Courter et al. |
| 2020/0307174 A1 | 10/2020 | Woytowitz et al. |

OTHER PUBLICATIONS

Marachel, Loic; "Advances in Octree-Based All-Hexahedral Mesh Generation: Handling Sharp Features"; 2009; pp. 66-84; Gamma Project, I.N.R.I.A., Rocquencourt, Le Chesnay, France (20 pages).

Armstrong, Cecil G. et al.; "Common themes in multi-block structured quad/hex mesh generation"; School of Mechanical and Aerospace Engineering, Procedia Engineering 124; 2015; pp. 70-82; Elsevier Ltd (13 pages).

Schneiders, Robert et al.; "Octree-based Generation of Hexahedral Element Meshes"; CiteSeer; Dec. 1999; pp. 1-12; RWTH Aachen University, Aachen Germany (12 pages).

Yu, Wuyi, et al.; "Recent Algorithms on Automatic Hexahedral Mesh Generation"; The 10th International Conference on Computer Science & Education (ICCSE 2015); Jul. 22-24, 2015; pp. 697-702; Cambridge University, UK (6 pages).

Shepherd, Jason F.; "Topologic and Geometric Constraint-Based Hexahedral Mesh Generation"; The University of Utah; May 2007; pp. 1-171; Salt Lake City, UT (195 pages).

\* cited by examiner

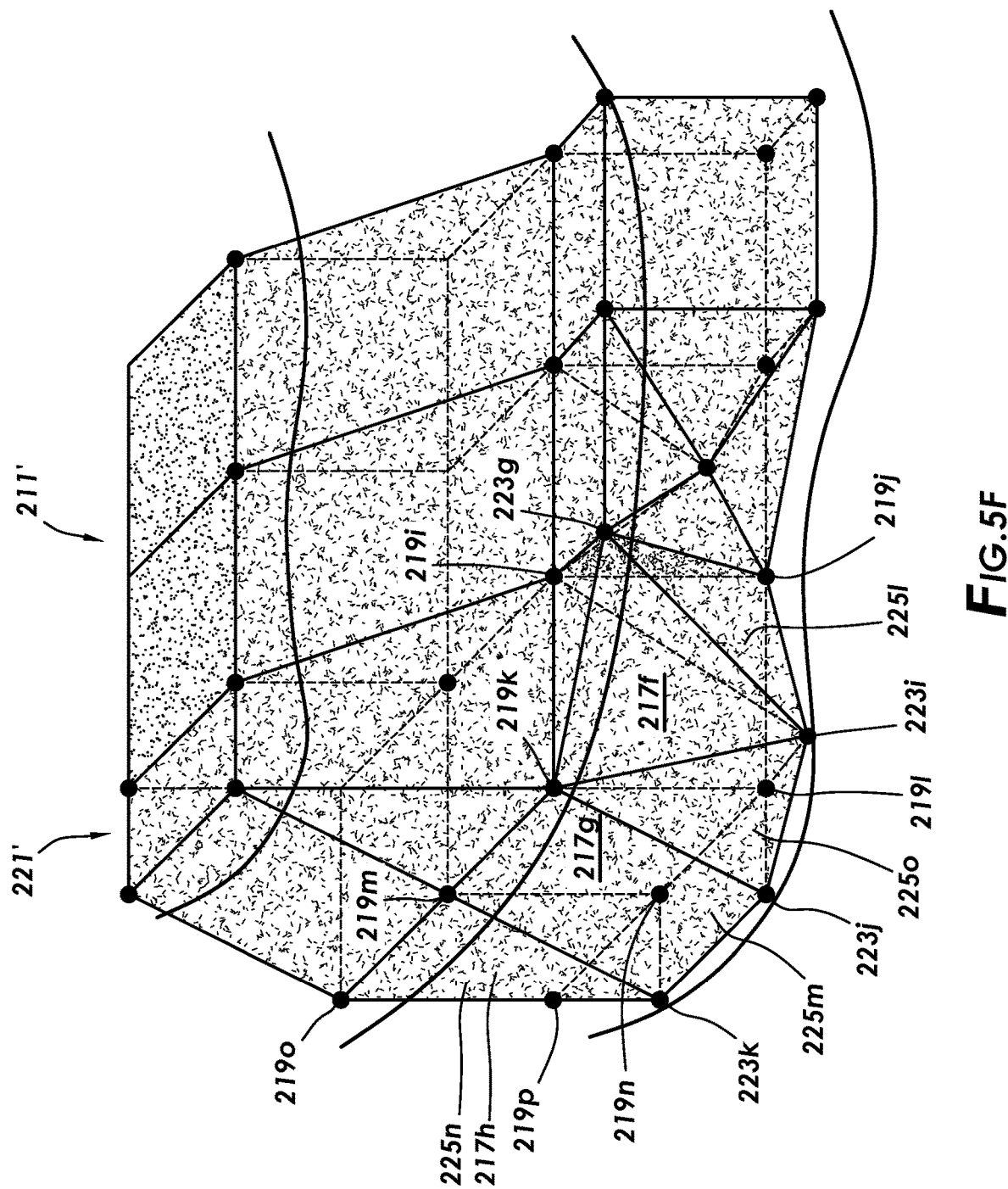

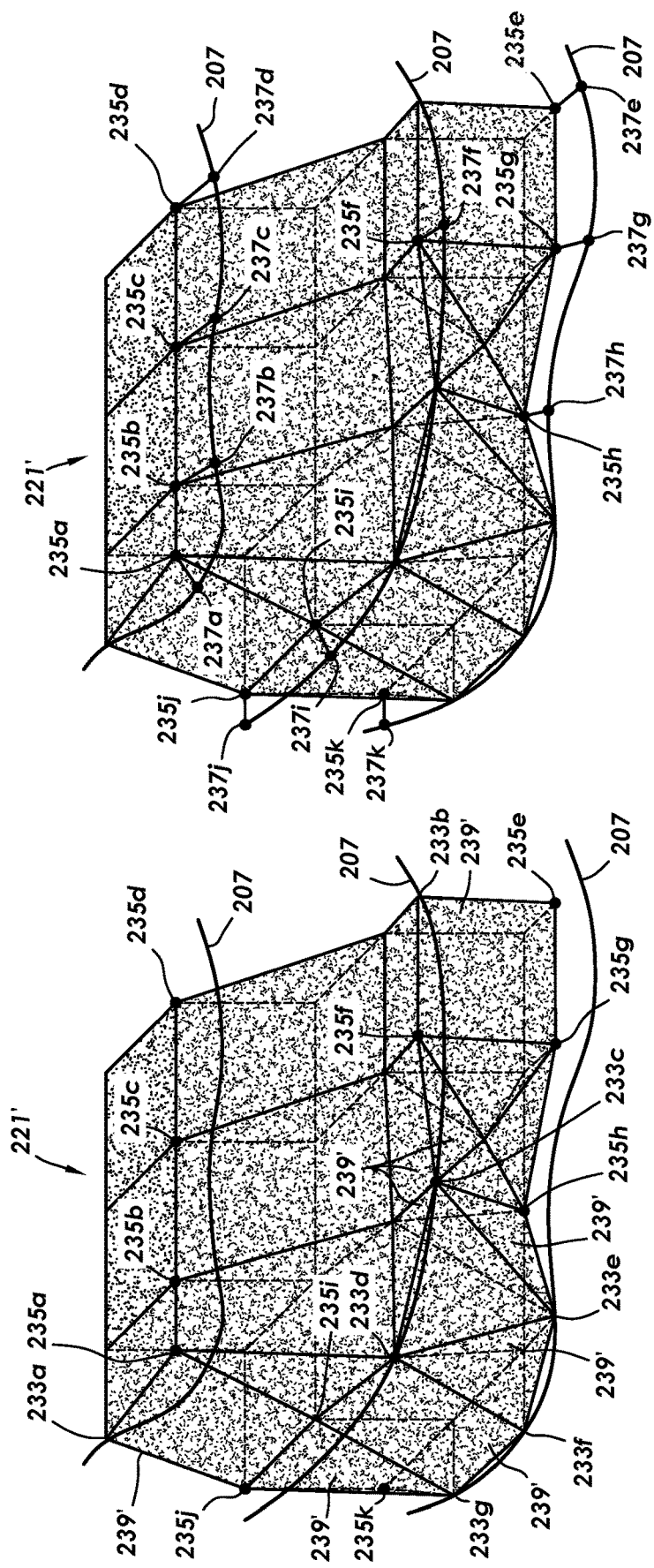

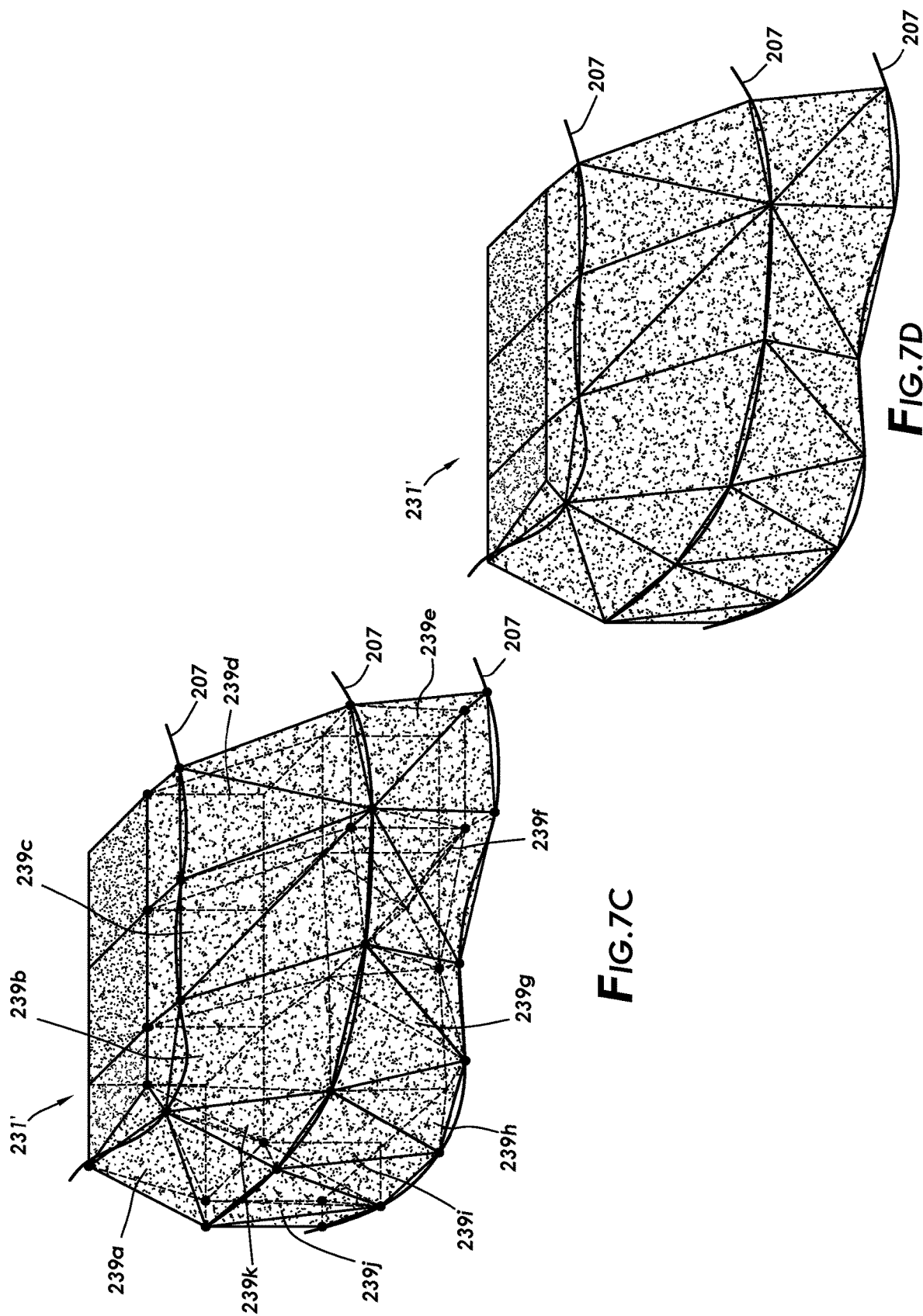

MESHING OPERATION FOR REPRESENTING A 3D PRINTED OBJECT

CROSS-REFERENCE TO RELATED APPLICATIONS

This application is a continuation of U.S. application Ser. No. 17/095,075, filed Nov. 11, 2020, which claims priority from U.S. provisional Application No. 62/936,148, filed Nov. 15, 2019, which is hereby incorporated by reference herein in its entirety.

TECHNICAL FIELD/FIELD OF THE DISCLOSURE

The present disclosure relates to generation of a mesh describing a 3D printed part based on an object model.

BACKGROUND OF THE DISCLOSURE

When a three-dimensional (3D) model is to be 3D printed, the 3D model is typically represented by a mesh that represents the surface of the object. The 3D model is typically delivered to a slicer to be converted into multiple layers representing the layers to be printed by the 3D printer used to produce an object based on that model. Depending on the desired resolution of the 3D print, the height of each layer may be 0.1 mm or finer.

However, because the resultant 3D printed object is created one layer at a time, a finite element analysis (FEA) of the original 3D model may not accurately represent the actual properties of the 3D printed part due to the changes to the actual geometry of the 3D printed object during the slicing operation. For example, each layer of the part includes a perimeter that may correspond to but not perfectly match the corresponding profile of the 3D model, resulting in differences at each layer between the 3D printed object and the model. Additionally, contours occurring between the layers may not be faithfully reproduced due to the nature of the 3D printing process. An FEA of the original model will not account for these variations between the original model and the 3D printed object. Additionally, depending on desired resolution, analyzing each layer of the sliced model as it relates to the adjacent layers may result in an unnecessarily high amount of computational load to analyze the properties of the 3D printed object.

SUMMARY

The present disclosure provides for a method. The method may include providing a model of a three-dimensional (3D) part. The method may include slicing the model into multiple layers. The method may include identifying an infill-wall boundary and an exterior-interior boundary of each layer of the model. The method may include identifying a first layer of the multiple layers as a first critical layer. The method may include examining a second layer of the model and a third layer of the model, the second layer of the model above the first layer of the model at least a predetermined minimum number of layers, the third layer adjacent to and above the second layer. The second and third layers may be examined to determine if a difference in a dimension of the perimeter of the second layer and the third layer is above a predetermined threshold value. The method may include imposing a common two-dimensional reference grid on each critical layer, each two-dimensional reference grid made up of grid squares. The method may include constructing an interior voxel mesh of the model, the interior voxel mesh including a plurality of voxels. The method may include augmenting the interior voxel mesh to construct an augmented mesh. The method may include extending the augmented mesh to construct a protomesh, the protomesh having an exterior surface. The method may include extruding the exterior surface of the protomesh to construct a final mesh. The method may include 3D printing the 3D part represented by the model according to the multiple layers of the slicing operation. The method may include conducting a finite element analysis of the 3D printed part using the final mesh.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIGS. 5A-F depict perspective views of the model of FIG. 4A during the meshing operation.

FIGS. 7A-D depict perspective views of the model of FIG. 5F during the meshing operation.

DETAILED DESCRIPTION

Figure 1:
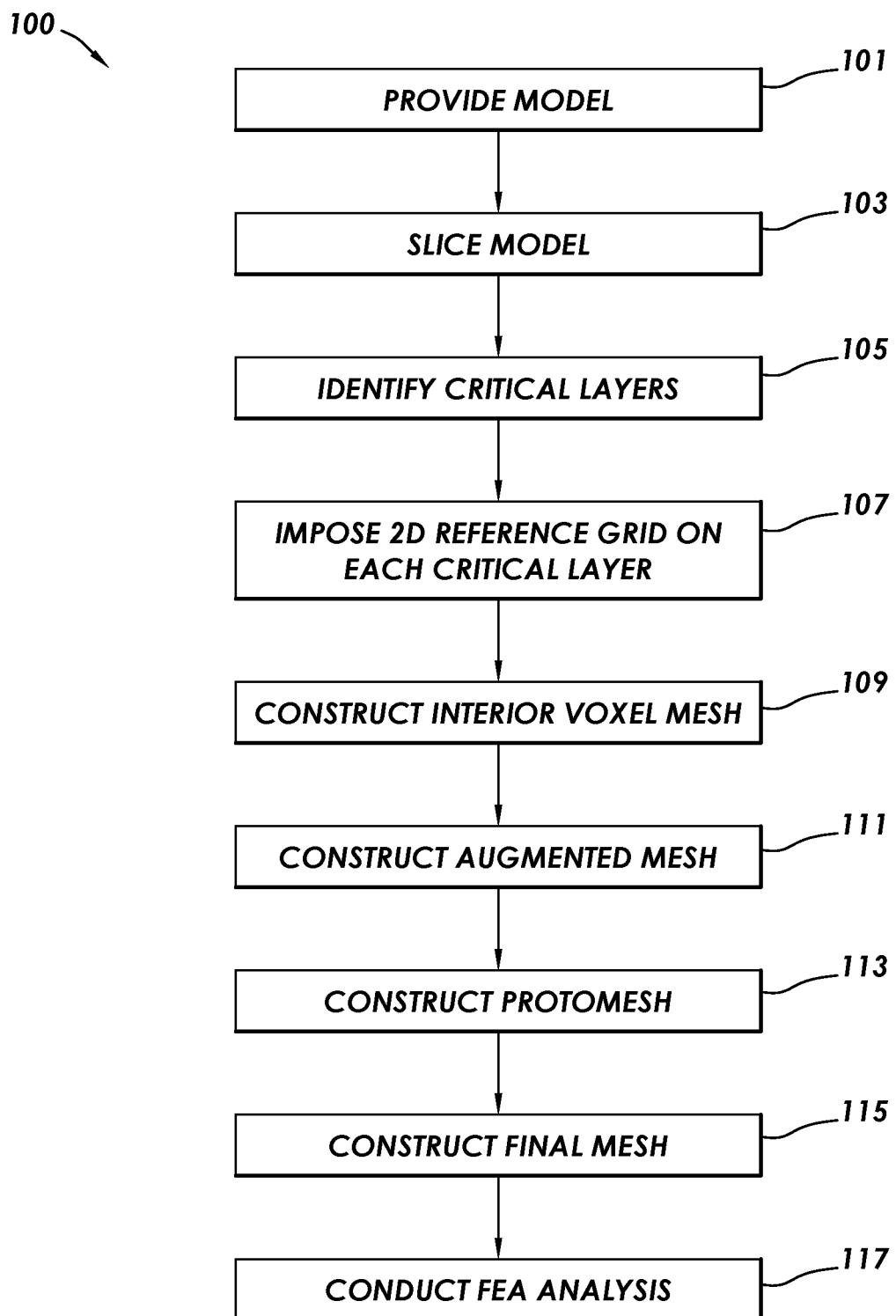
FIG. 1 depicts a process flow diagram for a meshing operation consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

For the purposes of this disclosure, the relative direction referred to by the terms "top," "above," "higher," and "upper" refer to a direction away from the print bed in the direction of the progression of the print, and the relative direction referred to by the terms "bottom," "below," and "lower" refer to a direction toward the print bed in the direction opposite the progression of the print.

FIG. 1 depicts a process flow diagram for meshing operation 100 consistent with at least one embodiment of the present disclosure. A model 10 for meshing may be provided (101). In some embodiments, model 10 may be a 3D model that describes the boundary of an object being represented by model 10. In some embodiments, model 10 may be represented by describing its boundary, i.e. the two-dimensional surface enclosing a region of space. In some embodiments, model 10 may be described by a stereolithography file, referred to as an STL model. In such an embodiment, model 10 may be an oriented triangulation of the corresponding surface of the object represented by model 10. However, model 10 may be represented by any model format known in the art without deviating from the scope of this disclosure.

Model 10 may then be sliced (103) into multiple layers for use by a 3D printing operation as described further herein below. The slicing operation may generate a collection of indexed layer-wise information, each of which includes the information necessary to print a single layer of the final 3D printed part. Among the layer-wise information may be, for example and without limitation, information relating to the regions of the 3D printed part including, for example and without limitation, the shell, wall, skin, infill, and gaps. Shell, wall, skin, infill, and gaps are intended to have their ordinary meaning to one of ordinary skill in the art. Shell may refer to the outer parts of the model and may include the wall (generally vertical portions of the shell) and the skin (generally horizontal portions of the shell), the thicknesses of which are defined by the slicing parameters input into the slicing software as further described below. Infill may refer to the internal portion of the 3D printed part within the shell. Additionally, information relating to the boundaries of these regions, such as the boundary between infill and inner perimeter of the wall, defining an infill-wall boundary, and the outer perimeter of the wall, defining an exterior-interior boundary, may be identified by the slicing operation and may be included in the layer-wise information.

The slicing operation 103 may be undertaken according to slicing parameters input into slicing software by a user and may be determined based on the type of 3D printing process used, particular aspects of the 3D printer used, and other considerations including, for example and without limitation, desired resolution of the 3D printed part as defined by layer height and the thickness of the wall region. One such slicing parameter defines the distance between each layer generated by the slicing operation 103 in the direction of progression of printing as defined by, for example and without limitation, the direction of relative movement between the layer being printed and the subsequent layer, defined as the "Z-axis" where each layer is defined in the mutually perpendicular "X-axis" and "Y-axis."

Figure 2:
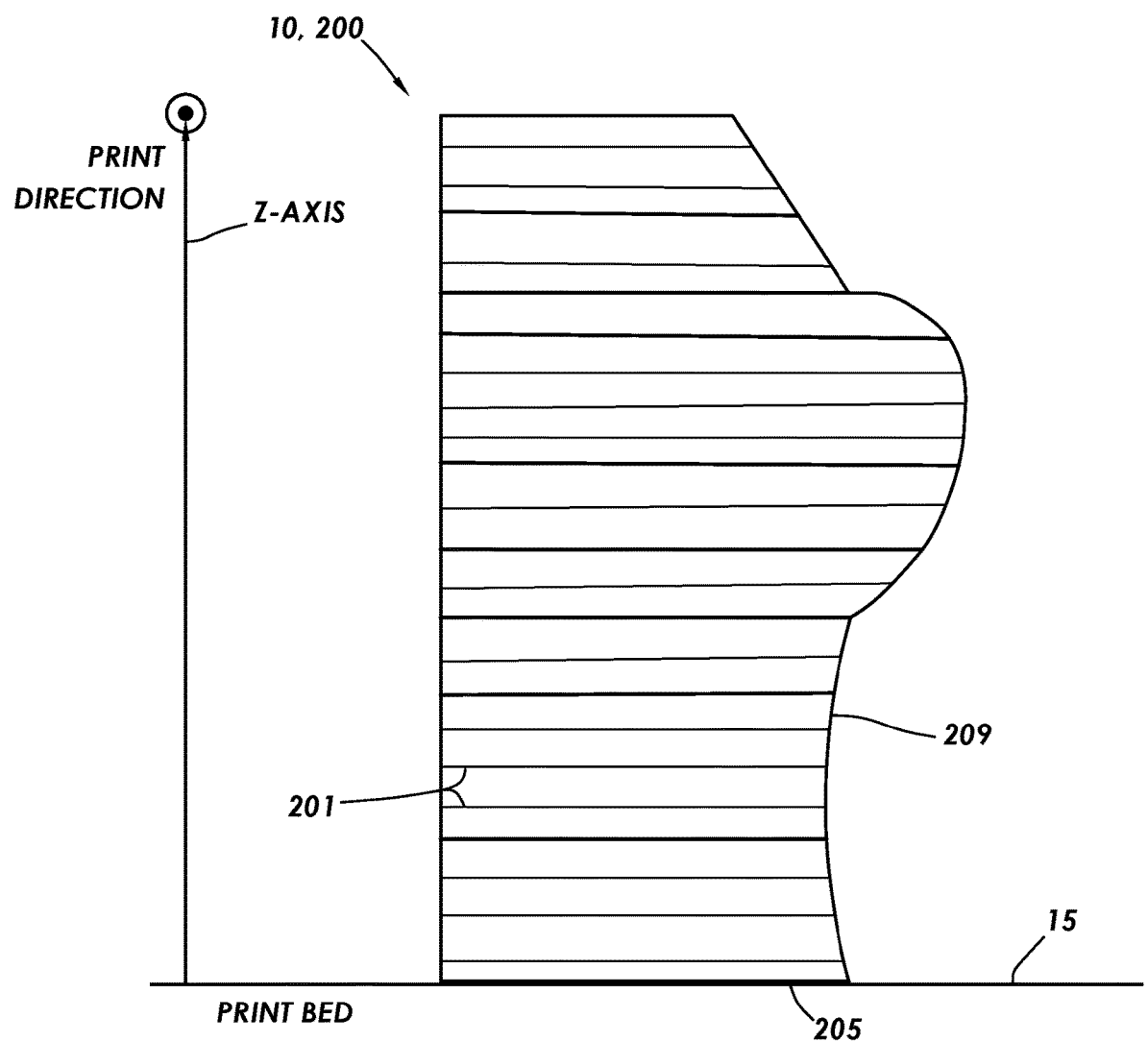
FIG. 2 depicts a cross section view of a part during a meshing operation consistent with at least one embodiment of the present disclosure after a slicing operation.

The indexed layer-wise information generated by the slicing operation 103 is shown in FIG. 2, which depicts a graphical, 2D representation of a cross-section of model 10, depicted as model 200, as represented by layers 201. FIG. 2 depicts layers 201 as defined by exterior-interior boundary 209. However, because of the nature of the 3D printing operation, a part printed according to layers 201 as output by the slicing operation 103, the actual boundary of the 3D printed part resulting from the layers generated according to slicing operation 103 corresponds to the ends of each layer 201 and not to the actual position of exterior-interior boundary 209, which indicates a faithful representation of model 10 from which model 200 was sliced.

With reference to FIG. 1, layers 201 may be analyzed to identify critical layers (105). In some embodiments, the layer abutting print bed 15, referred to herein as bottom layer 205, may be identified as a critical layer. In order to identify additional critical layers, adjacent layers 201 may be compared to determine whether sufficient change between two subsequent layers exists. In some embodiments, the identification of critical layers operation 105 may examine a range of layers between a predetermined minimum value, represented herein as "m," and a predetermined maximum value, represented herein as "M" above a layer identified as critical. The range of layers between m and M defines a minimum and a maximum separation between layers identified as critical layers during the identification of critical layers operation 105. In some embodiments, m and M may be predetermined based on, for example and without limitation, model dimensions, relevant scales, level of detail desired in the final mesh, or other contributing factors. In some embodiments, m and M may both be 1, in which case every layer 201 of model 200 may be identified as a critical layer. By applying maximum and minimum separation, the detail level of the mesh resulting from methods described herein consistent with at least one embodiment of the present disclosure may be selected. In some embodiments, the selection of the minimum separation m may reduce the number of layers identified as critical layers, thereby increasing the speed of analyses of the model generated according to the present disclosure as compared to a model generated using all layers. Additionally, the selection of the maximum separation M may set a minimum number of critical layers to be identified such that, without being bound to theory, too much detail in the model is not lost or such that a sufficient number of elements are available to undertake analysis as further described below.

Because bottom layer 205 is identified as a critical layer, the identification of critical layers operation 105 first examines each layer 201 of model 200 between m layers above bottom layer 205 first layer and M layers above bottom layer 205 to identify if there is a sufficient change between adjacent layers 201. As used herein, a sufficient change refers to a difference in a dimension of the perimeter of each layer 201 above a predetermined threshold value. In some embodiments, for example and without limitation, the area contained each layer 201 may be compared with the area of the last identified critical layer. Such a comparison may, for example, give an estimate of the average change from the last identified critical layer to the currently considered layer. As an example, for a grid size given by d, a threshold value could be given by, for example and without limitation, a change in area that exceeds d multiplied by the perimeter of the critical layer polygon.

Where such a sufficient change between adjacent layers is identified, the lower of the two adjacent layers is identified as a critical layer. If no layers 201 in the range between m and M layers above the last-identified critical layer demonstrate a sufficient change, layer 201 that is M layers above the last-identified critical layer is identified as a critical layer. The identification of critical layers operation 105 continues by examining the layers above the newly identified critical layer in the range between m layers above the new critical layer and M layers above the new critical layer until the final layer of model 200 is reached.

Figure 3:
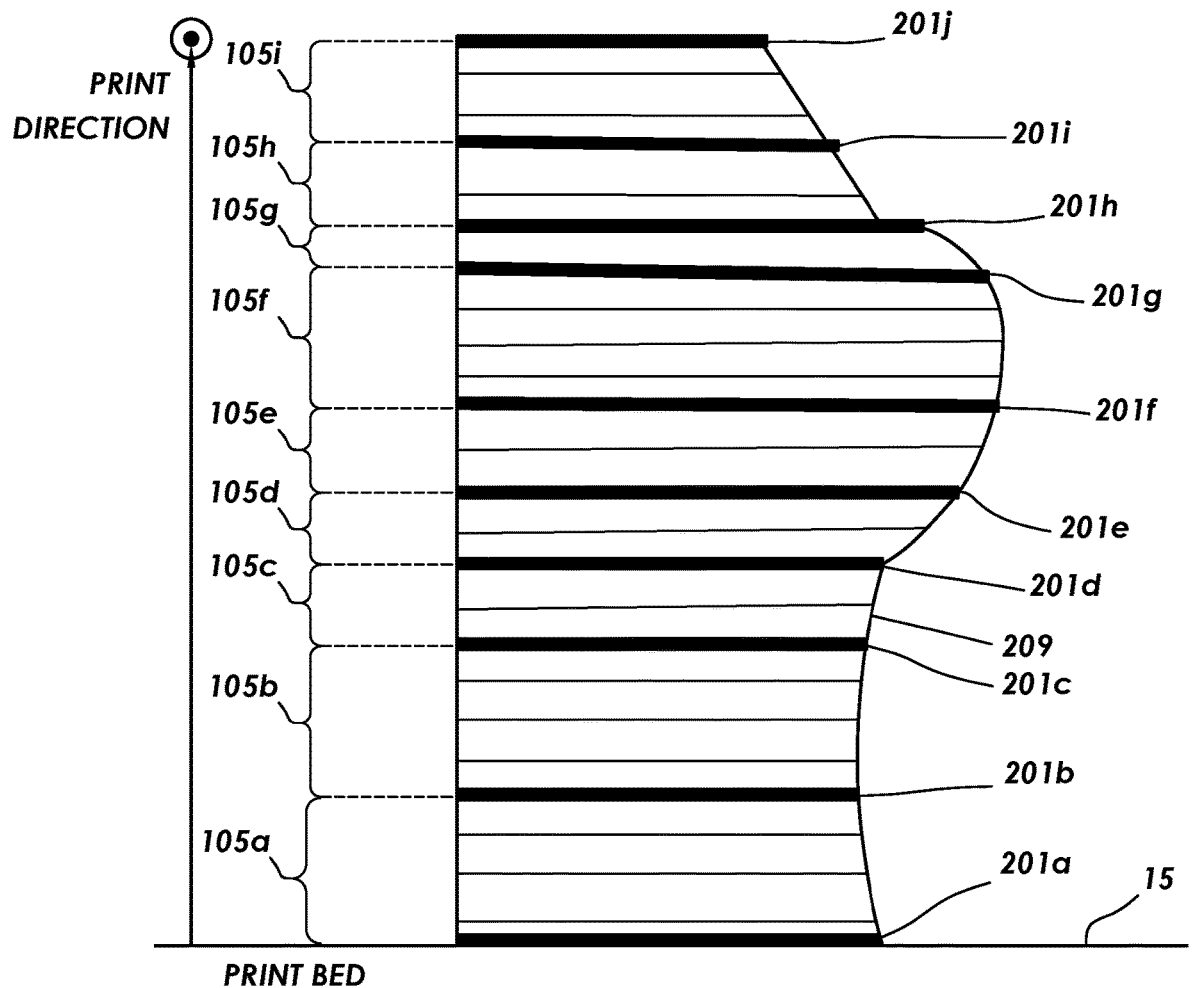
FIG. 3 depicts a cross section of the part of FIG. 2 during the meshing operation.

As an example of an identification of critical layers operation 105, FIG. 3 depicts model 200 with layers 201 identified as critical layers, depicted as critical layers 201a-j, shown as thicker lines than the rest of layers 201. The identification of critical layers operation 105 begins by identifying the bottom layer as critical layer 201a. For the purposes of this example, m is predetermined to be one layer and M is predetermined to be four layers. The first iteration of the identification of critical layers operation 105, indicated by 105a, examines layers 201 between m and M layers above bottom layer 205. As none of these layers exhibits a sufficient change between adjacent layers, critical layer 201b positioned M layers above bottom layer 205 is identified as critical.

The identification of critical layers operation 105 continues with a second iteration, indicated by 105b, of layers 201 between m and M layers above critical layer 201b. Once again, as none of these layers 201 exhibits a sufficient change between adjacent layers, critical layer 201c positioned M layers above bottom layer 205 is identified as critical.

The identification of critical layers operation 105 continues with a third iteration, indicated by 105c, of layers 201 between m and M layers above critical layer 201c. Here, sufficient change is identified between layers 201 that are two layers and three layers above critical layer 201c. The lower of these layers is therefore identified as critical layer 201d. Once a critical layer is identified, the iteration of the identification of critical layers operation 105 is concluded.

The repeated iterations may continue until the top of model 200 is reached depending on the height of model 200 or the number of layers 201 of model 200. For instance, in the present example, the identification of critical layers operation 105 similarly continues with a fourth iteration 105d that identifies critical layer 201e, a fifth iteration 105e that identifies critical layer 201f, a sixth iteration 105f that identifies critical layer 201g, a seventh iteration 105g that identifies critical layer 201h, and an eighth iteration 105h that identifies critical layer 201i according to the above-described comparisons of adjacent layers 201 between m and M layers above the last-identified critical layer. In some embodiments, the final iteration of the identification of critical layers operation 105 may be defined as the iteration in which the top layer of the model is included in the set of layers between m and M layers above the last-identified critical layer and in which no critical layers are identified below the top layer. In some embodiments, the top layer may be identified as a critical layer. For example, in the present example, the ninth iteration 105i may be defined as the final iteration and may identify the top layer as critical layer 201j.

Once all layers 201 of model 200 have been analyzed as described above, the identification of critical layers operation 105 is concluded, resulting in a set of identified critical layers, demonstrated in the above example as critical layers 201a j.

With reference to FIG. 1, once the set of identified critical layers is determined, a common two-dimensional (2D) reference grid may be imposed on each critical layer 201a-j in model 200 (107). In some embodiments, the 2D reference grid may be made up of elements referred to herein as grid squares, although other shapes of elements may be used including, for example and without limitation, rectangles.

The information contained in each layer may then be used to construct an interior voxel mesh (109). Voxels, as used herein, refer to volume elements as defined between corresponding grid squares of the reference grids of each adjacent critical layer. The interior voxel mesh refers to the voxels fully contained within the infill region of the model as described further below. As used herein, the term voxel does not imply that vertical and horizontal dimensions of any voxel as described herein are the same or that any two such voxels need have the same dimensions.

During the construction of an interior voxel mesh operation 109, voxels may be identified as the space defined between the corresponding squares of the common 2D reference grid of adjacent critical layers 201a-j. During the construction of an interior voxel mesh operation 109, for each critical layer 201a-i (excluding the top of model 200), the critical layer 201b-j directly above the critical layer 201a-i is considered. For each grid square of the 2D reference grid that is completely contained by each critical layer 201a-i, the voxel directly thereabove is included in the mesh if the corresponding grid square of the 2D reference grid of the directly above critical layer 201b-j is also completely contained by the directly above critical layer 201b-j. If the corresponding grid square of the 2D reference grid of the directly above critical layer 201b-j is not completely contained, the voxel directly thereabove is not included in the mesh.

In some embodiments, a grid square of a 2D reference grid may be considered completely included within its layer if all of the grid square is within the 2D perimeter of the layer. In some embodiments, a grid square of a 2D reference grid may be considered completely included within its layer if all of the grid square is within the infill-wall boundary of the layer.

Figure 4:
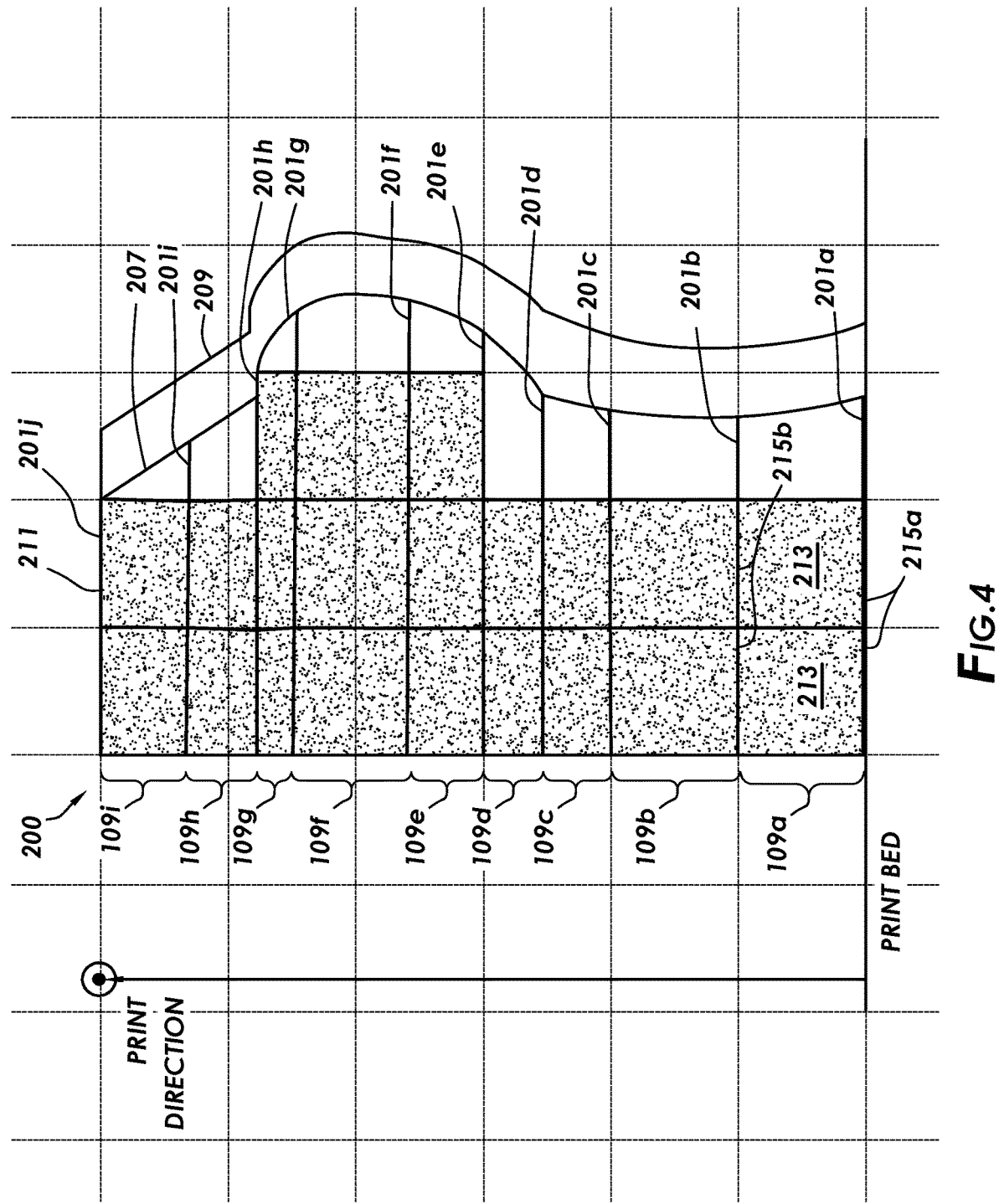
FIG. 4 depicts a cross section of the part of FIG. 3 during the meshing operation.

As an example of a construction of an interior voxel mesh operation 109, FIG. 4 depicts model 200 with interior voxel mesh 211 made up of individual voxels 213 included within interior voxel mesh 211 as identified as described above. FIG. 4 also depicts infill-wall boundary 207 used to define the complete inclusion of a grid square of each 2D reference grid of each layer and exterior-interior boundary 209. FIG. 4 depicts only critical layers 201a-j of model 200 for clarity.

The first iteration of the construction of an interior voxel mesh operation 109, indicated by 109a, considers 2D reference grid squares, shown in cross-section as squares 215a, completely included within critical layer 201a as compared with 2D reference grid squares, shown in cross-section as squares 215b, completely included within critical layer 201b. Voxels 213 which correspond to the space between completely included squares 215a and completely included squares 215b are included within interior voxel mesh 211, as indicated by being shaded in FIG. 4. Repeated iterations of the construction of an interior voxel mesh operation 109 are conducted until all critical layers of model 200 are considered. In the present example, the construction of an interior voxel mesh operation 109 repeats the comparison operations, indicated by iterations 109b-i, to identify voxels 213 to be included in interior voxel mesh 211 between critical layers 201b and 201c, 201c and 201d, 201d and 201e, 201e and 201f, 201f and 201g, 201g and 201h, 201h and 201i, and 201i and 201j, respectively, to fully identify interior voxel mesh 211. For the purposes of this disclosure, vertices of voxels 213 are referred to as nodes.

Figure 4A:
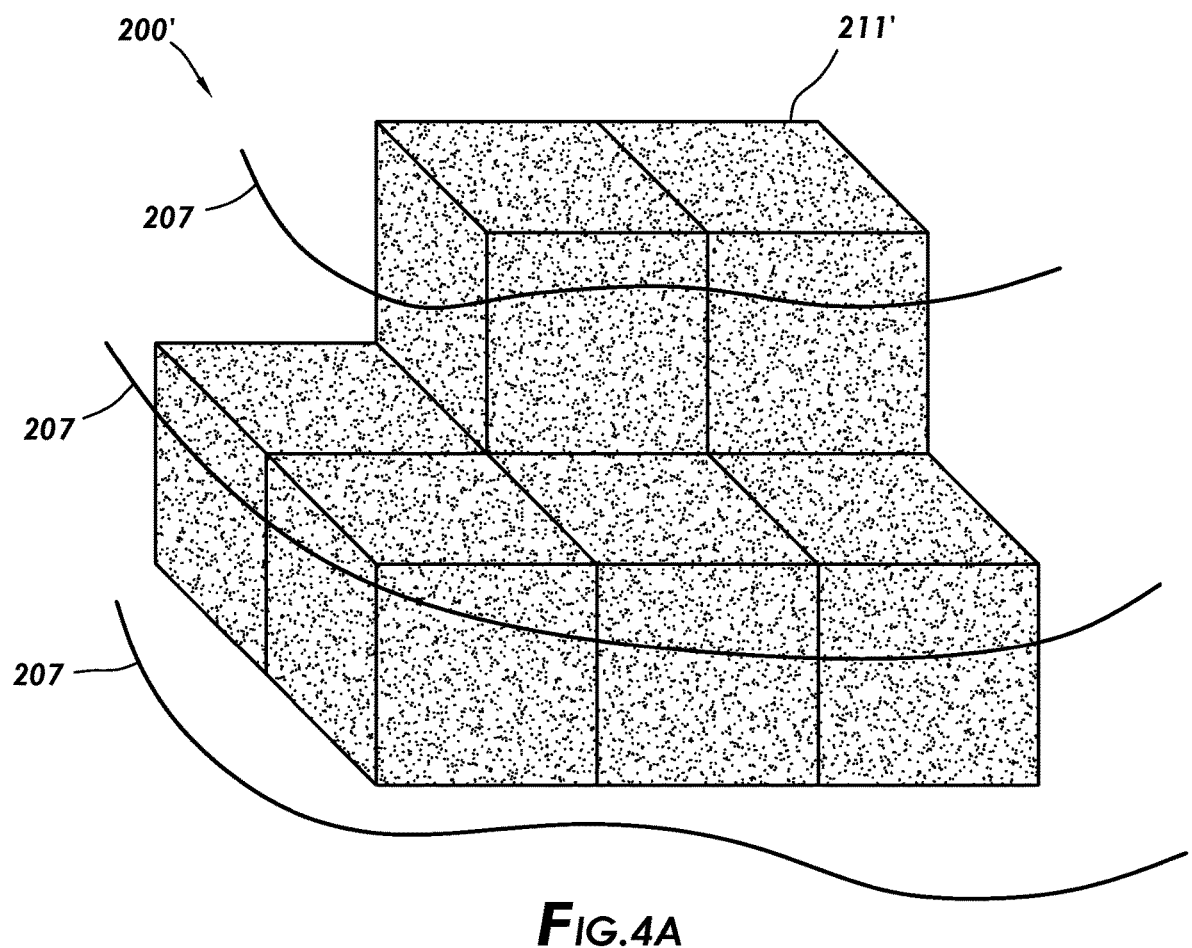
FIG. 4A depicts a perspective view of a model during a meshing operation consistent with at least one embodiment of the present disclosure.

FIG. 4A depicts a 3D perspective view of interior voxel mesh 211' of model 200' generated as described herein above as generated with respect to infill-wall boundary 207, shown as the 2D perimeter of three adjacent critical layers.

With reference to FIG. 1, once interior voxel mesh 211 is constructed, interior voxel mesh 211 may be augmented to construct an augmented mesh (111) such that augmented mesh 221 more closely conforms to a selected boundary of model 200. Although described in this disclosure with reference to infill-wall boundary 207, one of ordinary skill in the art with the benefit of this disclosure will understand that augmentation of interior voxel mesh 211 may be applied to any boundary. Such augmentation of interior voxel mesh 211 refers to the extension of the exterior faces of interior voxel mesh 211 to infill-wall boundary 207. For the purposes of this disclosure, an exterior face is defined as a face of a voxel wherein infill-wall boundary 207 is positioned within the adjacent non-mesh voxel, i.e. a voxel that is not included within interior voxel mesh 211. In some embodiments, the position of infill-wall boundary 207 within the adjacent non-mesh voxel may be identified as one of several approximate configurations such that the resultant exterior faces of interior voxel mesh 211 are either quadrilaterals or triangles. Augmentation is applied to each exterior voxel face as defined above such that the distance between interior voxel mesh 211 and infill-wall boundary 207 is reduced and the exterior surface of interior voxel mesh 211 more closely resembles the 3D boundary of the original model 10 represented by model 200.

In some embodiments, the augmentation operation 111 includes the positioning of additional nodes between existing nodes of exterior faces of voxels 213 of interior voxel mesh 211 as described herein below. In some embodiments, the additional nodes may be positioned along the established lines of the 2D reference grid of each corresponding critical layer. In some embodiments, additional nodes added during augmentation may be added when the distance between the existing nodes of exterior faces of voxels 213 of interior voxel mesh 211 and infill-wall boundary 207 is above a threshold distance, defining a threshold augmentation distance. In some embodiments, the threshold augmentation distance may be selected such that any additional volume elements as further discussed below are within predetermined design constraints including, for example and without limitation, relatively small sides, aspect ratio, relative side length, or interior angles of the additional volume element. The additional nodes added to interior voxel mesh 211 may define new volume elements added to interior voxel mesh 211 as defined between any added nodes and the existing exterior nodes of interior voxel mesh 211, to generate augmented mesh 221. In some embodiments, nodes added during the augmentation operation 111 may be positioned such that the additional volume elements are defined by four nodes (defining tetrahedral elements), five nodes (defining pyramidal elements), six nodes (defining wedge elements), or eight nodes (defining hexahedral elements).

In some embodiments, where an added volume element would be defined by a different number of nodes, thus resulting in a non-tetrahedral, pyramidal, wedge, or hexahedral element, an additional node may be added to the new volume element to subdivide the additional element into multiple volume elements, each of which is tetrahedral, pyramidal, wedge, or hexahedral. In some such embodiments, the additional node may be added at the center of the new element.

Figure 5:
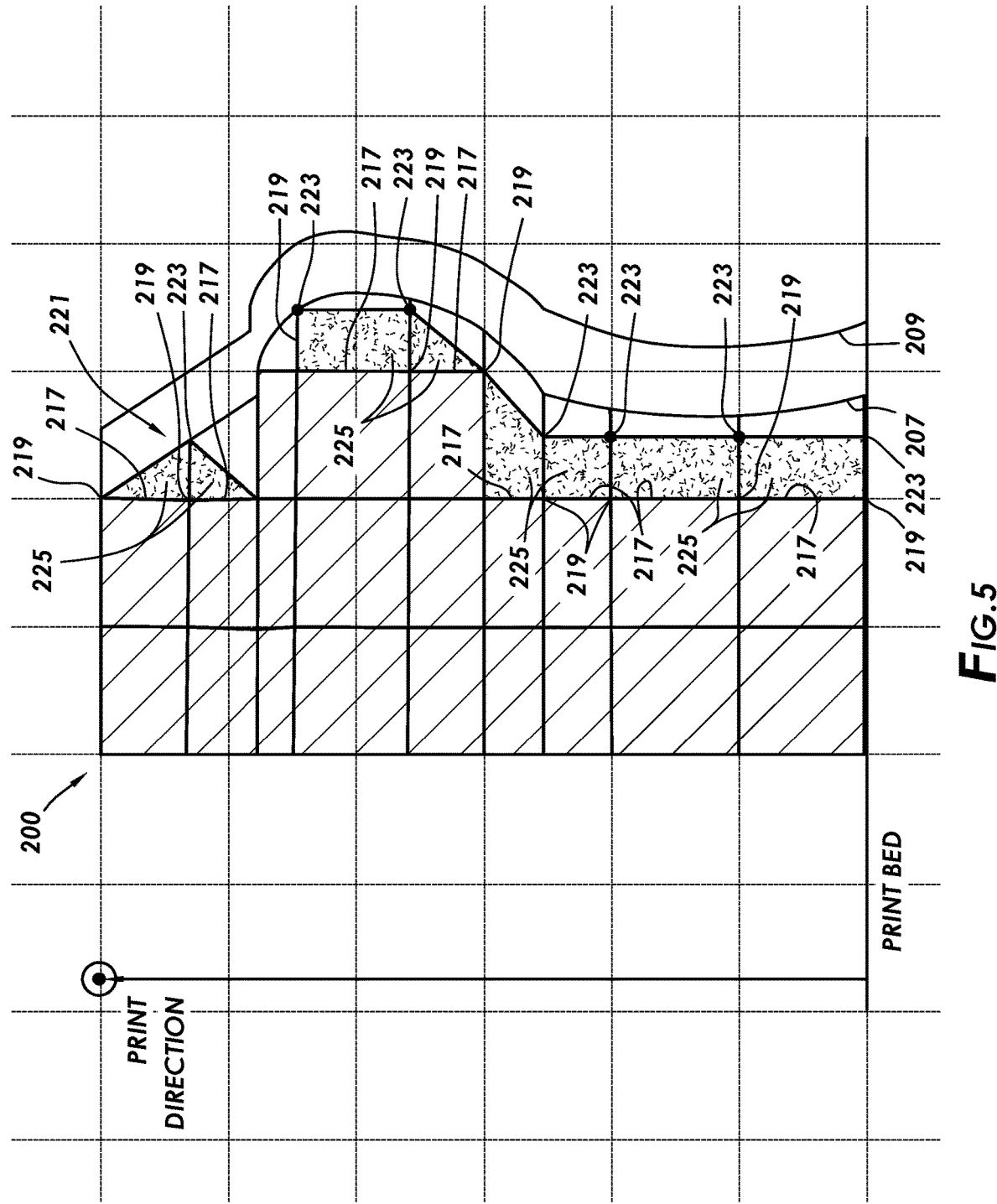
FIG. 5 depicts a cross section view of the part of FIG. 4 during the meshing operation.

As an example of an augmentation operation 111, FIG. 5 depicts a cross section of model 200 showing augmented mesh 221 (interior voxel mesh 211 crosshatched for clarity). During augmentation operation 111, exterior faces 217 of interior voxel mesh 211 are identified. For each exterior node 219 of each exterior face 217 of interior voxel mesh 211, where the distance between the exterior node 219 and infill-wall boundary 207 is above the augmentation distance threshold, an additional augmented node 223 is added, such that augmented nodes 223 and exterior nodes 219 define additional volume elements 225 (depicted in FIG. 5 as shaded) to define augmented mesh 221. In some embodiments, as shown in FIG. 5, augmented nodes 223 may be positioned on or within infill-wall boundary 207.

Figure 5A:
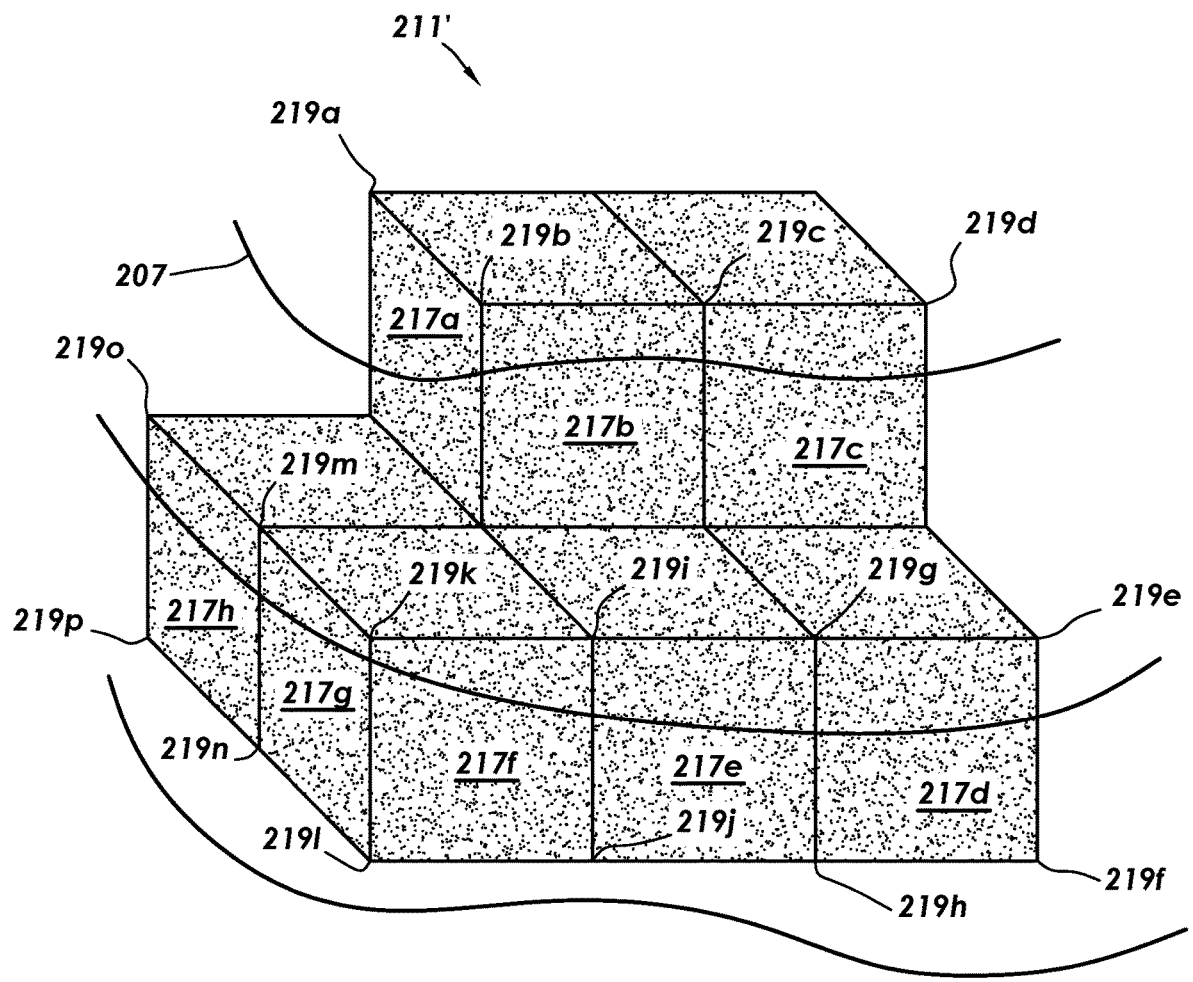
Figure 5C:
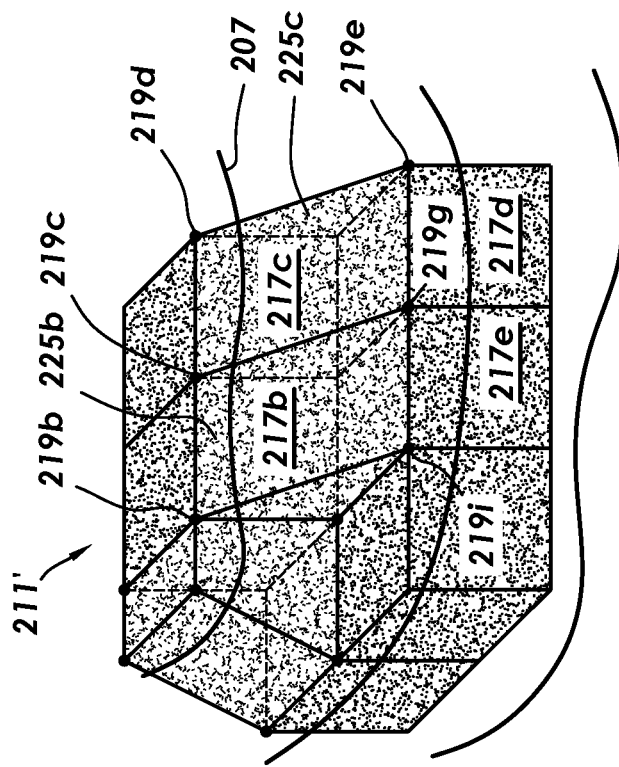
Figure 5B:
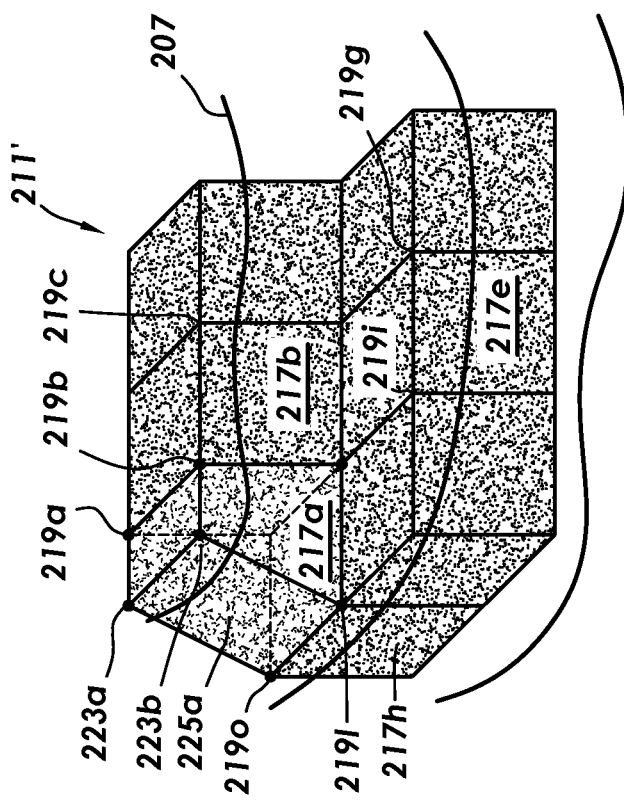

As another example, FIGS. 5A-F depict 3D perspective views of stages of augmentation operation 111 as applied to interior voxel mesh 211'. As shown in FIG. 5A, exterior faces 217a-h are first identified as described above. As an example, augmentation operation 111 may begin with exterior face 217a. Because exterior nodes 219a, 219b of exterior face 217a are farther than the threshold augmentation distance from infill-wall boundary 207, augmented nodes 223a, 223b are added to interior voxel mesh 211' such that new volume element 225a is defined as between exterior nodes 219a, 219b of exterior face 217a and exterior nodes 219l, 219o of exterior face 217h (which is the exterior face of the voxel directly below exterior face 217a) as shown in FIG. 5B. In this case, new volume element 225a is hexahedral in shape.

Augmentation operation 111 may similarly continue for exterior face 217b. However, because exterior nodes 219b, 219c are not farther than the threshold augmentation distance from infill-wall boundary 207, no augmented nodes are added. Instead, new volume element 225b is defined between exterior nodes 219b, 219c of exterior face 217b and exterior nodes 219g, 219i of exterior face 217e (which is the exterior face of the voxel directly below exterior face 217b) as shown in FIG. 5C. In this case, new volume element 225b is a wedge shape. Augmentation operation 111 may continue for each of the remaining exterior faces, 217c-h. Similarly to exterior face 217b, exterior nodes 219c, 219d of exterior face 217c are within the threshold augmentation distance from infill-wall boundary 207, resulting in wedge-shaped new volume element 225c. In some embodiments, such as at a corner between additional volume elements (as between new volume elements 225a and 225b), an additional element may be added between the nodes of adjacent new volume elements or exterior nodes of interior voxel mesh 211' such as new volume element 225d as shown in FIG. 5D.

Figure 5E:
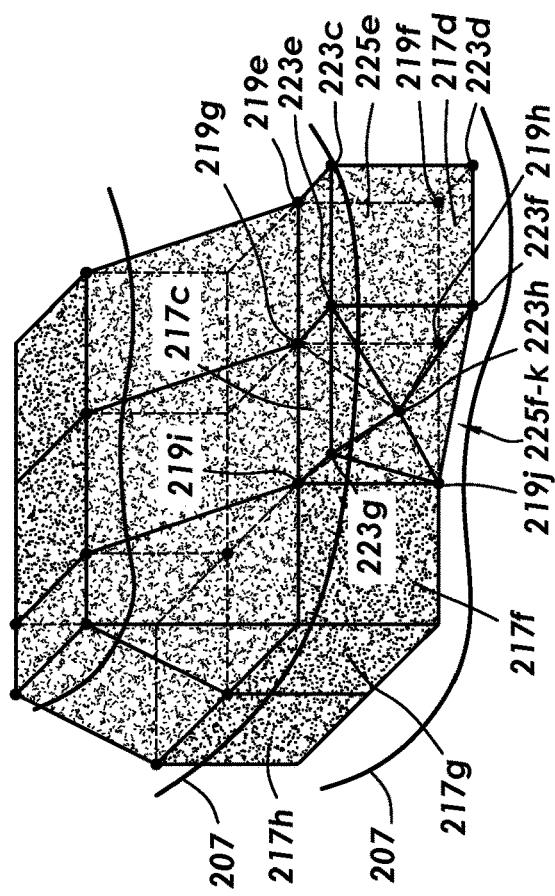
Figure 5D:
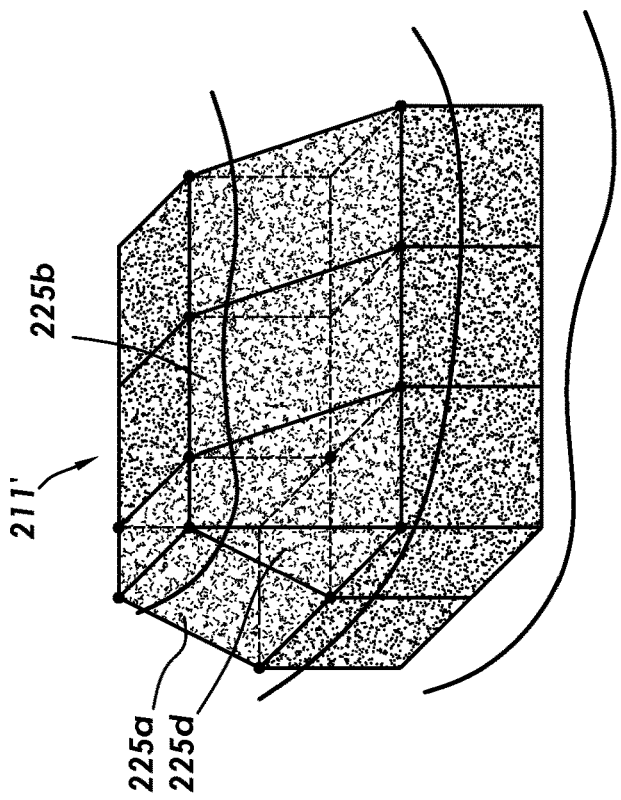

As shown in FIG. 5E, exterior faces 217d-h are positioned on the lowermost level of interior voxel mesh 211'. In such a case, all four exterior nodes may be augmented to generate new volume elements. For example, with respect to exterior face 217d, all four exterior nodes, 219e-h are farther from infill-wall boundary 207, such that augmented nodes 223c-f are added to interior voxel mesh 211', resulting in new volume element 225e, which is hexahedral in shape.

With regard to exterior face 217e, only exterior nodes 219g, 219h, and 219i are farther from infill-wall boundary 207, resulting in the addition of augmented nodes 223e-g to interior voxel mesh 211'. However, were augmented nodes 223e-g joined with exterior nodes 219g-j, the resultant new volume element would be impermissibly defined by seven nodes. Therefore, an additional augmented node 223h is added to the center of the seven nodes, thereby resulting in the addition of five pyramidal new volume elements 225f-k to interior voxel mesh 211'.

As depicted in FIG. 5F, the augmentation operation 111 may be continued for exterior face 217f to generate new volume element 225l defined by exterior nodes 219i-l and augmented nodes 223g and 223i, exterior face 217g to generate new volume element 225m defined by exterior nodes 219k-n and augmented nodes 223j and 223k, and exterior face 217h to generate new volume element 225n defined by exterior nodes 219m-p and augmented node 223k according to the same procedures as discussed above. New volume element 225o may be added to the corner space between new volume elements 225l and 225m as described above. Once each exterior face 217a-h has been augmented, augmented mesh 221' as defined by interior voxel mesh 211' and each of new volume elements 225a-o may be considered complete.

With reference to FIG. 1, once augmented mesh 221 is constructed, augmented mesh 221 may be extended to construct a protomesh (113). During the extension operation 113, augmented mesh 221 is extended to generate protomesh 231 which more closely matches infill-wall boundary 207. During the extension operation 113, the distance between each exterior node of augmented mesh 221 and infill-wall boundary 207 is determined. For each exterior node that is within a predetermined threshold distance of infill-wall boundary 207, defining an extension threshold distance, the node is repositioned to be on infill-wall boundary 207. In some embodiments, the extension operation 113 may be conducted at the same time as the augmentation operation 111, i.e. wherein the predetermined threshold distance of infill-wall boundary 207 is large enough such that all augmented nodes are repositioned on infill-wall boundary 207. Each such node is referred to herein as a snapped node 233. For each exterior node that is not within the extension threshold distance, referred to herein as remaining nodes 235, a point along infill-wall boundary 207 aligned with the layer corresponding to the remaining node that is closest to the remaining node is identified. In some embodiments, this distance is measured directly and is not necessarily in the directions of the 2D reference grid of each layer. Each such identified point, defined as extended nodes 237, along infill-wall boundary 207 is added to augmented mesh 221, and a new volume element, defined as extended volume elements 239, is added between the adjacent nodes to construct protomesh 231. In some embodiments, extended nodes 237 may be positioned such that the outer faces of protomesh 231 are triangles and quadrilaterals.

Figure 6A:
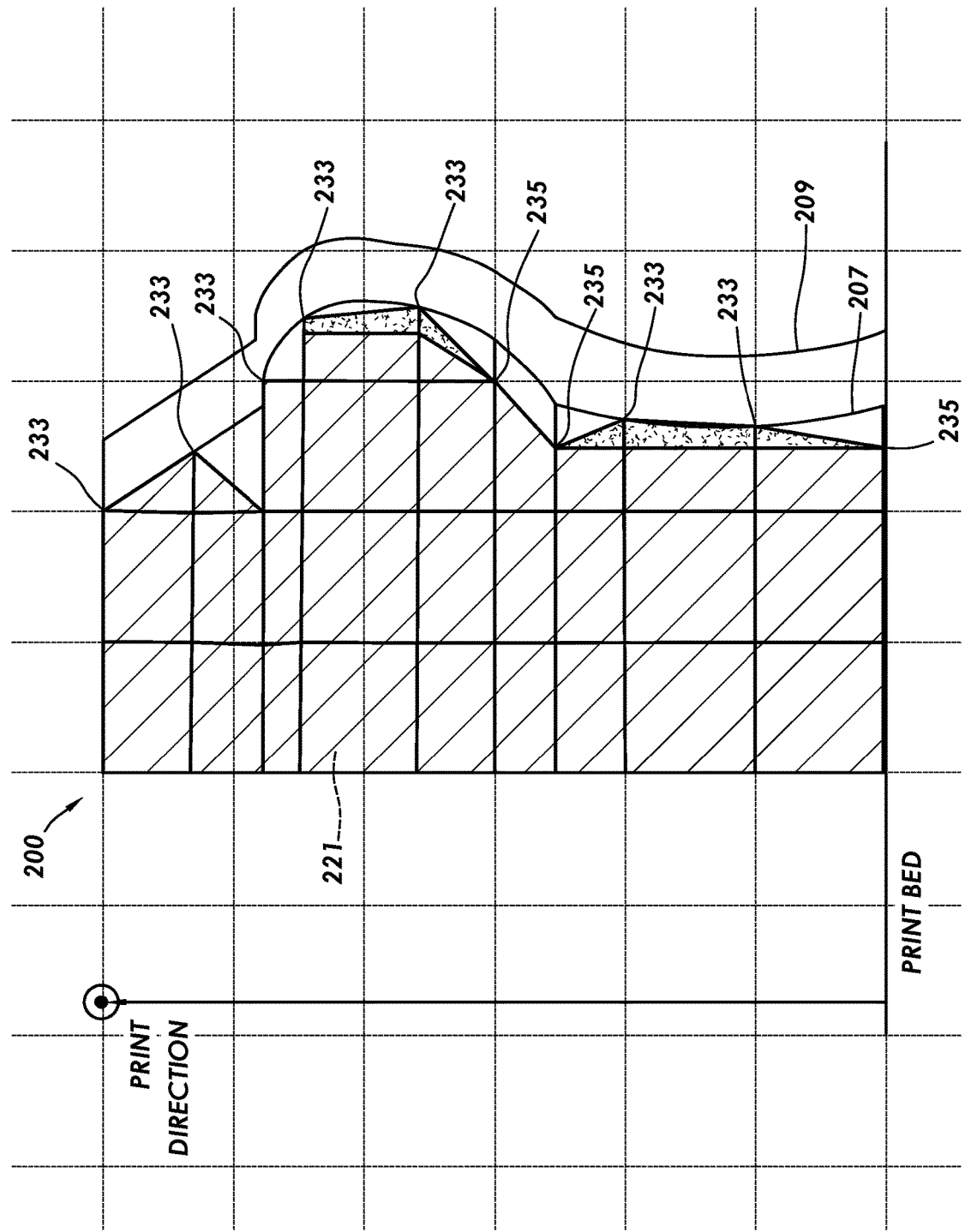
FIGS. 6A, 6B depict cross section views of the part of FIG. 5 during the meshing operation.
Figure 6B:
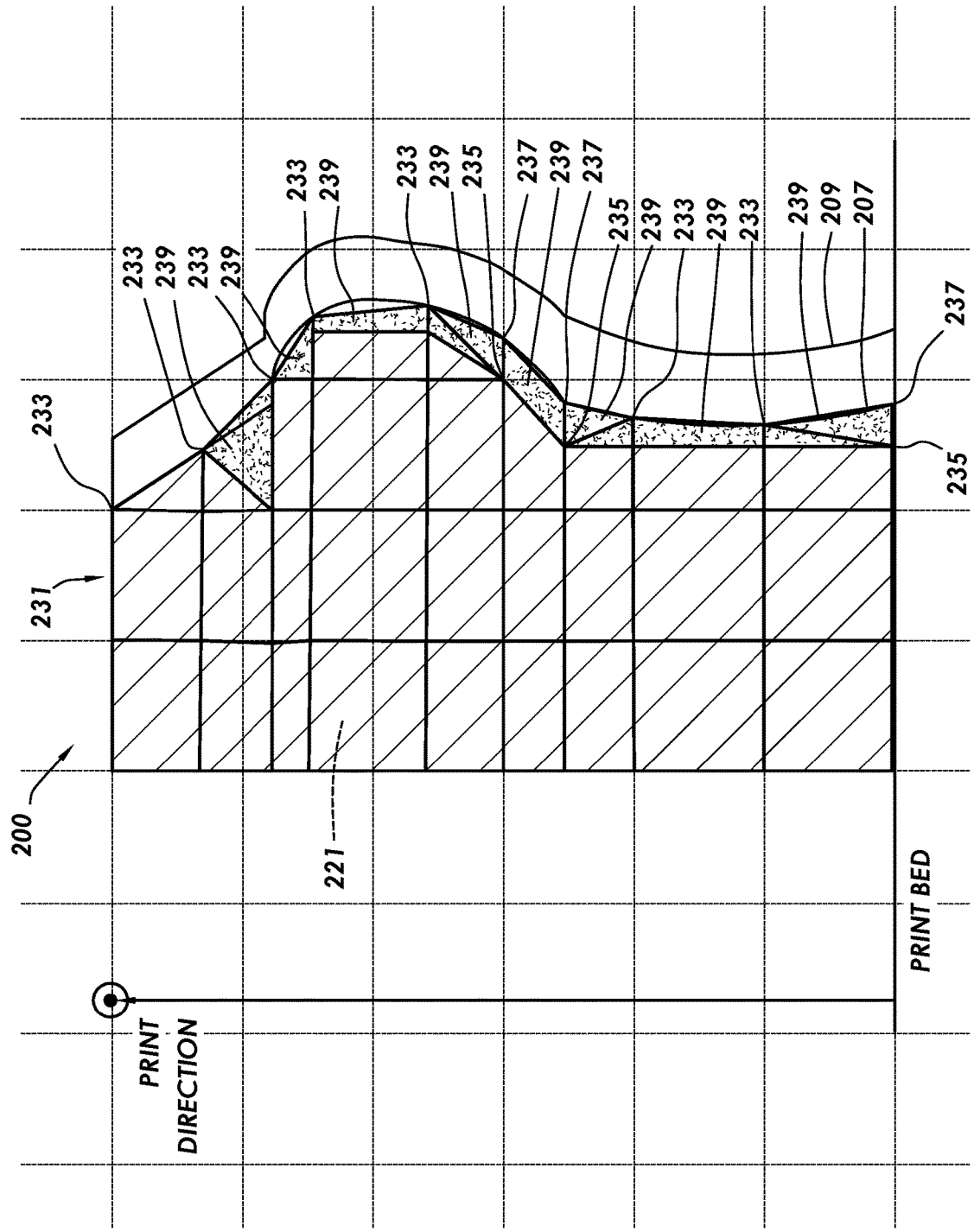

As an example, FIGS. 6A, 6B depict cross sections of model 200 showing extension operation 113 of augmented mesh 221 (shown crosshatched for clarity). As shown in FIG. 6A, exterior nodes of augmented mesh 221 that are within the extension threshold distance are moved to infill-wall boundary 207, depicted as snapped nodes 233. For each remaining node 235, an extended node 237 is identified such that each extended node 237 is positioned along infill-wall boundary 207 at a point closest to the corresponding remaining node 235 aligned with the layer of remaining node 235 as depicted in FIG. 6B. Snapped nodes 233, remaining nodes 235, and extended nodes 237 define extended volume elements 239 (shown shaded for clarity), which are added to augmented mesh 221 to construct protomesh 231.

As another example, FIGS. 7A-D depict 3D perspective views of stages of extension operation 113 as applied to augmented mesh 221'. As shown in FIG. 7A, the exterior nodes of augmented mesh 221' within the extension threshold distance are moved to infill-wall boundary 207, shown as snapped nodes 233*a-g*, with the corresponding extended volume elements 239' of augmented mesh 221' redefined by the new positions of snapped nodes 233*a-g*.

As shown in FIG. 7B, for each of remaining nodes 235*a-k* of augmented mesh 221', a corresponding extended node, shown as extended nodes 237*a-k*, is positioned on infill-wall boundary 207 aligned with the layer of each corresponding remaining node 235*a-k*. Extended volume elements 239*a-k*, as shown in FIG. 7C are added to augmented mesh 221' as defined between snapped nodes 233*a-g*, remaining nodes 235*a-k*, and extended nodes 237*a-k* to construct protomesh 231'. FIG. 7D depicts protomesh 231' with only exterior faces shown.

With reference to FIG. 1, once protomesh 231 is constructed, the exterior surface of protomesh 231 may be extruded to construct the final mesh (115). As protomesh 231 is constructed with reference to infill-wall boundary 207, protomesh 231 does not represent the wall region of model 200. During the extrusion operation 115, the outer surface of protomesh 231 may be extruded to construct final mesh 241 which includes a representation of all regions of model 200. During the extrusion operation 115, each exterior face of protomesh 231 is extruded in a direction parallel to the print bed a distance to approximate exterior-interior boundary 209 of model 200. For each exterior node of protomesh 231, a point along exterior-interior boundary 209 aligned with the layer corresponding to the exterior node that is closest to the exterior node is identified. At each such identified point, defined as outer wall node 243, along exterior-interior boundary 209 is added to protomesh 231, and a new volume element, defined as outer wall volume element 245, is added between the adjacent nodes to construct final mesh 241. In some embodiments, outer wall nodes 243 may be positioned such that the outer faces of final mesh 241 are triangles and quadrilaterals.

Figure 8:
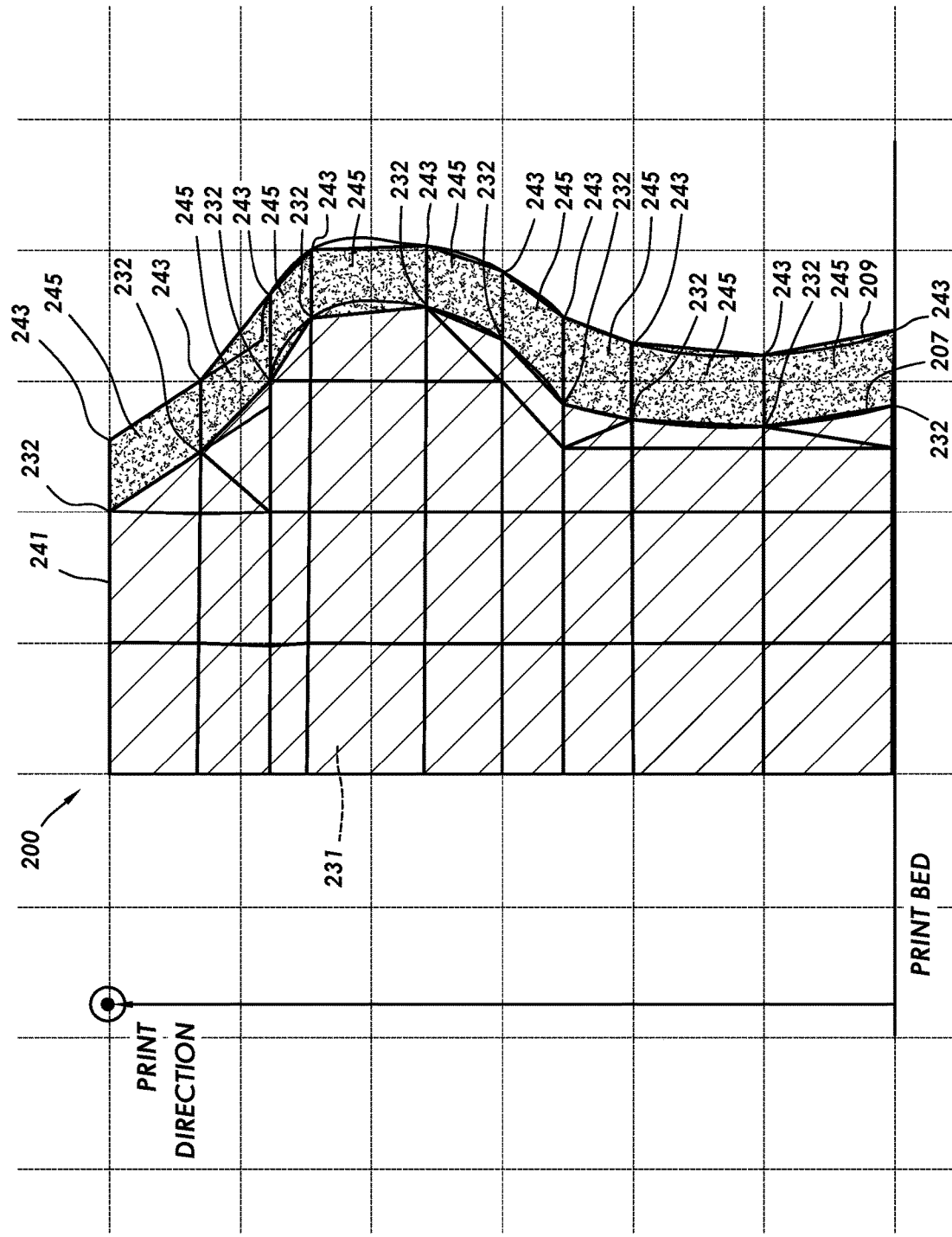
FIG. 8 depicts a cross section view of the part of FIG. 6B during the meshing operation.

As an example, FIG. 8 depicts a cross section of model 200 showing final mesh 241 as relates to protomesh 231 (shown crosshatched for clarity). As shown in FIG. 8, an outer wall node 243 is added along exterior-interior boundary 209 corresponding to each exterior node of protomesh 231, depicted as exterior nodes 232, as described herein above. Outer wall volume elements 245 (shown shaded for clarity) are added as defined between outer wall nodes 243, snapped nodes 233, and extended nodes 237, thereby, along with protomesh 231, defining final mesh 241.

Figure 9A:
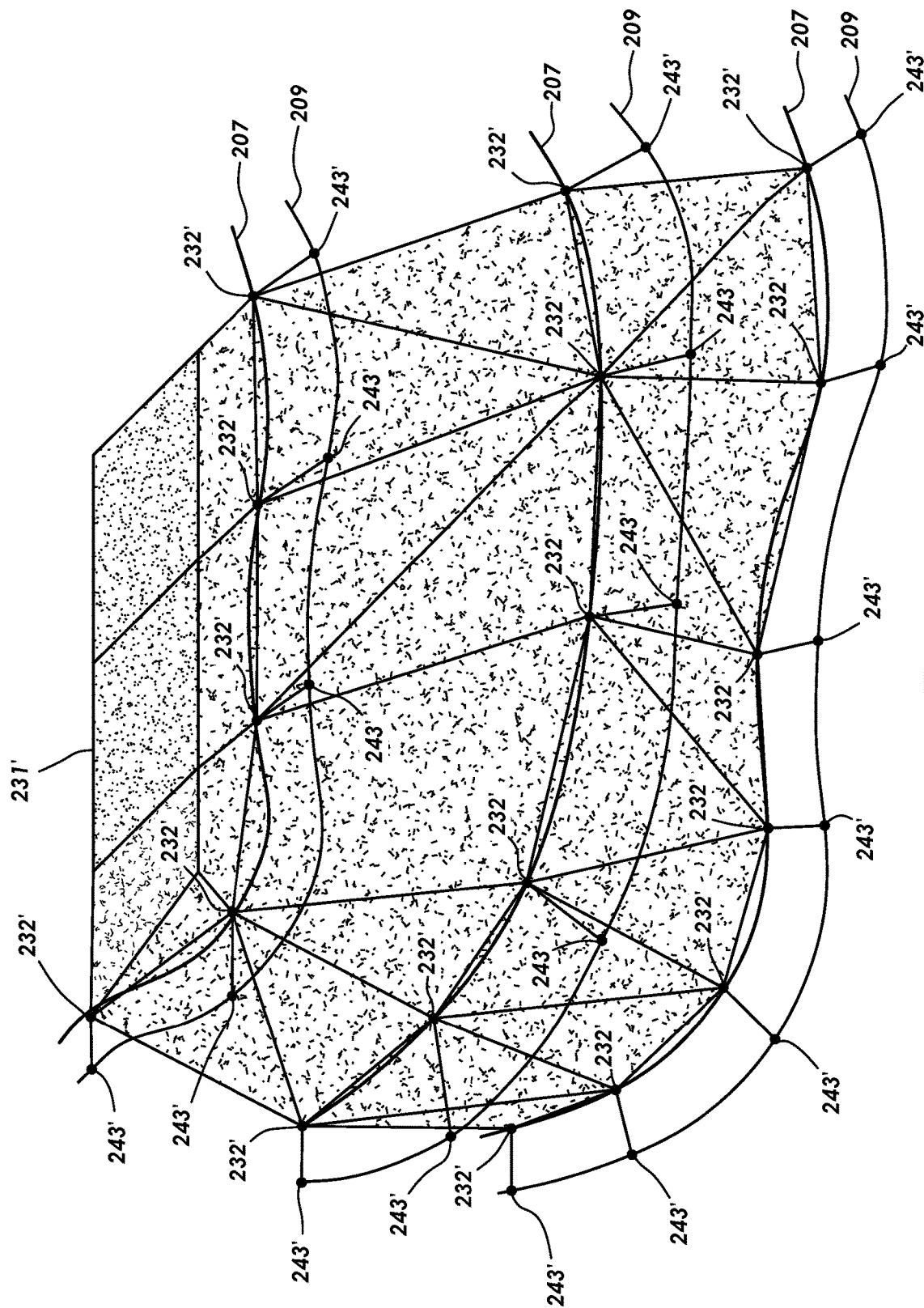
FIGS. 9A, 9B depict perspective views of the model of FIG. 7D during the meshing operation.
Figure 9B:
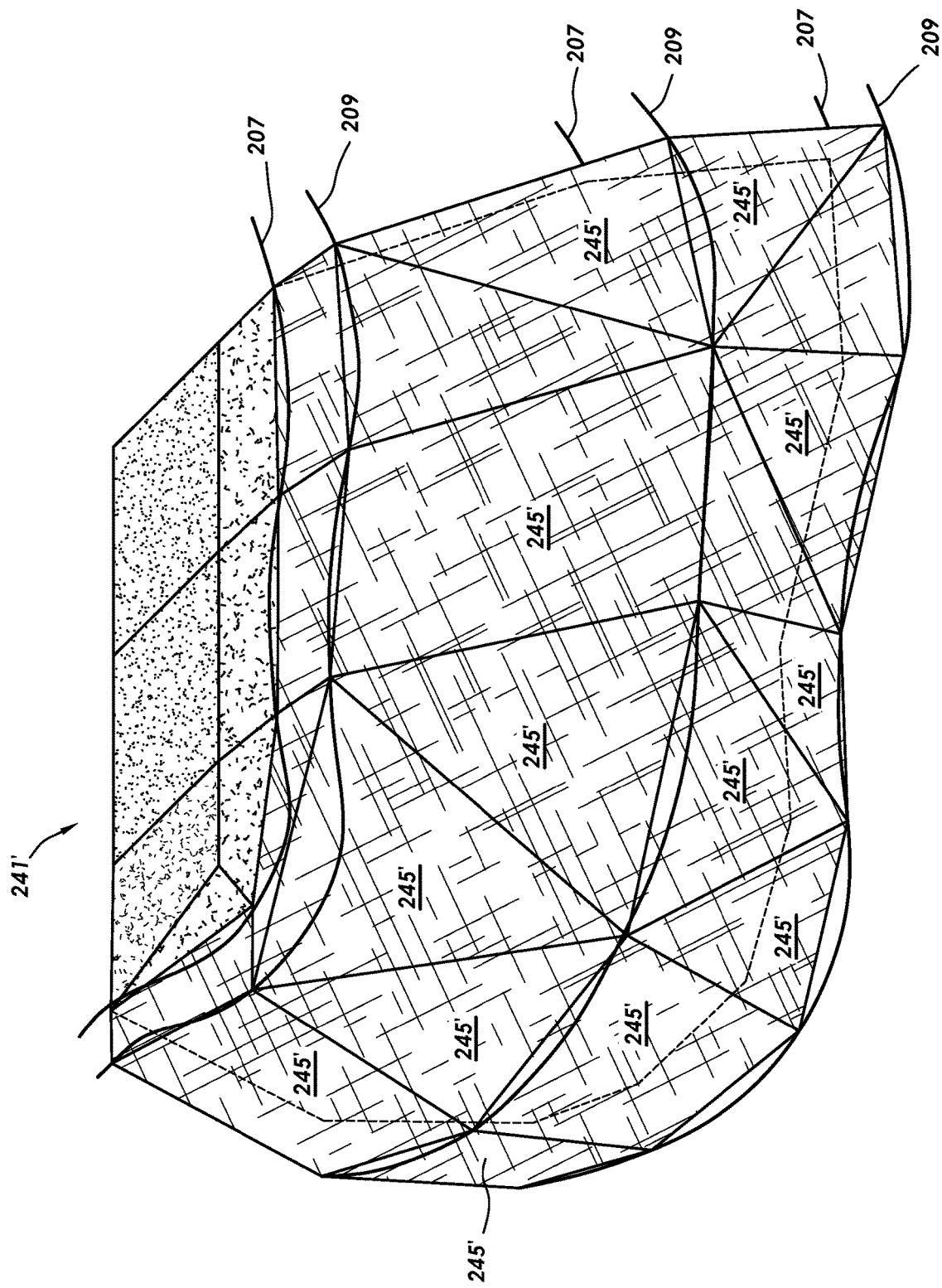

As another example, FIGS. 9A, 9B depict perspective views of stages of extrusion operation 115 as applied to protomesh 231'. As shown in FIG. 9A, for each exterior node of protomesh 231', depicted as exterior nodes 232', an outer wall node 243' is added along exterior-interior boundary 209 corresponding to the layer of the respective exterior node 232'.

Outer wall volume elements 245' are added between adjacent exterior nodes 232' and outer wall nodes 243', thereby forming final mesh 241' as shown in FIG. 9B. FIG. 9B depicts final mesh 241' with only exterior faces shown.

With respect to FIG. 1, once final mesh 241 is constructed by extruding the exterior surface of protomesh 231, final mesh 241 may be used for FEA analysis (117). Because final mesh 241 represents the object as created by the 3D printing process, final mesh 241 provides a better representation of the object being printed than the original model 10 upon which the object is based. In some embodiments, final mesh 241 may provide an accurate volumetric discretization of a volume with complex internal structure described layer-wise for any other use.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method comprising:
providing a model of a three-dimensional (3D) part;
slicing the model into multiple layers;
identifying an infill-wall boundary and an exterior-interior boundary of each layer of the model;
identifying a first layer of the multiple layers as a first critical layer;
examining a second layer of the model and a third layer of the model, the second layer of the model above the first layer of the model at least a predetermined minimum number of layers, the third layer adjacent to and above the second layer, the second and third layers examined to determine if a difference in a dimension of the perimeter of the second layer and the third layer is above a predetermined threshold value;
imposing a common two-dimensional reference grid on each critical layer, each two-dimensional reference grid made up of grid squares;
constructing an interior voxel mesh of the model, the interior voxel mesh including a plurality of voxels;
augmenting the interior voxel mesh to construct an augmented mesh;
extending the augmented mesh to construct a protomesh, the protomesh having an exterior surface;
extruding the exterior surface of the protomesh to construct a final mesh;
3D printing the 3D part represented by the model according to the multiple layers of the slicing operation; and
conducting a finite element analysis of the 3D printed part using the final mesh.

2. The method of claim 1, wherein the finite element analysis of the final mesh more closely corresponds to the properties of the 3D printed object than a finite element analysis of the model.

3. The method of claim 1, wherein the slicing operation generates a collection of indexed layer-wise information, each of which includes information necessary to 3D print a single layer of a 3D printed part based on the model.

4. The method of claim 3, wherein the indexed layer-wise information comprises information relating to the regions of the 3D printed part including an infill region, a wall region, a skin region, and gaps.

5. The method of claim 1, wherein the slicing operation is undertaken according to slicing parameters input into slicing software including one or more of layer height and wall thickness.

6. The method of claim 1, wherein the first critical layer is the bottom layer of the model.

7. The method of claim 1, wherein if the difference in the dimension of the perimeter of the second layer and the third layer is above the predetermined threshold value, the second layer is identified as a second critical layer.

8. The method of claim 7, further comprising:
examining a fourth layer of the model and a fifth layer of the model, the fourth layer of the model above the second layer of the model at least a predetermined minimum number of layers, the fifth layer adjacent to and above the fourth layer, the fourth and fifth layers examined to determine if a difference in a dimension of the perimeter of the fourth layer and the fifth layer is above a predetermined threshold value.

9. The method of claim 8, further comprising:
repeating the examining operations until a top layer of the model is examined; and
identifying the top layer as a critical layer.

10. The method of claim 1, wherein if the difference in the dimension of the perimeter of the first layer and the second layer is below the predetermined threshold value:
examining a fourth layer of the model, the fourth layer adjacent to and above the third layer to determine if a difference in a dimension of the perimeter of the third layer and the fourth layer is above a predetermined threshold value.

11. The method of claim 10, further comprising repeating the examination operation for subsequent layers until a critical layer is identified or until the separation between the first layer and the examined layer is a predetermined maximum value.

12. The method of claim 11, further comprising identifying the layer separated from the first layer by the predetermined maximum value as a critical layer.

13. The method of claim 1, wherein the construction operation comprises:
identifying, for a grid square of a first critical layer fully included within the infill-wall boundary of the first critical layer, whether a corresponding second grid square of a second critical layer is fully included within the infill-wall boundary of the second critical layer, the second critical layer adjacent to and above the first critical layer; and
for each such grid square of the first critical layer having such a second grid square of the second critical layer, including a voxel in the interior voxel mesh, the voxel being the volume defined between the first grid square and the second grid square.

14. The method of claim 1, wherein augmenting the interior voxel mesh comprises:
identifying an exterior face of a voxel of the interior voxel mesh, the exterior face defined as a face of a voxel of the interior voxel mesh wherein the infill-wall boundary of the model is positioned within an adjacent non-mesh voxel, the exterior face defined by one or more existing nodes of the interior voxel mesh;
determining, for each existing node, whether the distance between the existing node and the infill-wall boundary is above a threshold augmentation distance; and
where the distance is above the threshold augmentation distance, positioning an additional node between the existing node and the infill-wall boundary, the additional node positioned spaced apart from the existing node in a direction perpendicular to the exterior face.

15. The method of claim 14, further comprising repeating the determining and positioning operations for all nodes of all exterior faces, wherein the one or more additional nodes positioned define one or more new volume elements added to the interior voxel mesh, such that the new volume elements and interior voxel mesh define the augmented mesh.

16. The method of claim 15, further comprising:
identifying that a new volume element of the one or more new volume elements added to the interior voxel mesh is non-tetrahedral, pyramidal, wedge, or hexahedral in shape; and
positioning an additional node within the identified new volume element such that the identified new volume element is subdivided into multiple volume elements.

17. The method of claim 1, wherein the extending operation comprises:
determining a distance between an exterior node of the augmented mesh and the infill-wall boundary; and
where the exterior node is within a predetermined extension threshold distance of the infill-wall boundary, defining a snapped node, repositioning the exterior node onto the infill-wall boundary; or where the exterior node is not within the extension threshold distance of the infill-wall boundary, defining a remaining node, adding an extended node aligned with the layer corresponding to the remaining node at a position closest to the remaining node along the infill-wall boundary.

18. The method of claim 17, further comprising repeating the determining and positioning or repositioning operations for all exterior nodes of the augmented mesh, wherein the snapped and extended nodes define one or more new volume elements added to the augmented mesh, such that the new volume elements and augmented mesh define the protomesh.

19. The method of claim 1, wherein the extruding operation comprises:

identifying a point along the exterior-interior boundary that is aligned with and closest to an exterior node of the protomesh; and adding an outer wall node at the identified point to the protomesh.

20. The method of claim 19, further comprising repeating the identifying and adding operations for all exterior nodes of the protomesh, wherein the outer wall nodes define one or more new volume elements added to the protomesh, such that the new volume elements and the protomesh define the final mesh.

* * * * *